United States Patent
Moe et al.

(10) Patent No.: US 10,227,240 B2
(45) Date of Patent: Mar. 12, 2019

(54) WATER RECLAMATION SYSTEM AND METHOD

(71) Applicants: Edward Beverly Moe, Montgomery, TX (US); James Thomas Oakes, Huffman, TX (US)

(72) Inventors: Edward Beverly Moe, Montgomery, TX (US); James Thomas Oakes, Huffman, TX (US)

(*) Notice: Subject to any disclaimer, the term of this patent is extended or adjusted under 35 U.S.C. 154(b) by 0 days.

(21) Appl. No.: 14/928,809

(22) Filed: Oct. 30, 2015

(65) Prior Publication Data

US 2017/0120172 A1    May 4, 2017

(51) Int. Cl.
| | |
|---|---|
| *B01D 33/03* | (2006.01) |
| *B01D 33/72* | (2006.01) |
| *C02F 1/38* | (2006.01) |
| *C02F 1/52* | (2006.01) |
| *B01D 17/02* | (2006.01) |
| *C02F 1/40* | (2006.01) |
| *B01D 33/80* | (2006.01) |
| *C02F 1/00* | (2006.01) |
| *B01D 29/01* | (2006.01) |
| *B01D 29/68* | (2006.01) |

(Continued)

(52) U.S. Cl.
CPC .......... *C02F 1/006* (2013.01); *B01D 17/0208* (2013.01); *B01D 29/01* (2013.01); *B01D 29/684* (2013.01); *B01D 29/965* (2013.01); *B01D 33/722* (2013.01); *B01D 33/801* (2013.01); *C02F 1/40* (2013.01); *C02F 1/52* (2013.01); *C02F 2101/101* (2013.01); *C02F 2101/103* (2013.01); *C02F 2101/20* (2013.01); *C02F 2101/203* (2013.01); *C02F 2101/22* (2013.01); *C02F 2101/32* (2013.01); *C02F 2103/007* (2013.01); *C02F 2103/10* (2013.01); *C02F 2103/20* (2013.01); *C02F 2103/28* (2013.01); *C02F 2103/325* (2013.01); *C02F 2103/365* (2013.01)

(58) Field of Classification Search
CPC .................................................. B01D 2311/25
See application file for complete search history.

(56) References Cited

U.S. PATENT DOCUMENTS

2,919,898 A * 1/1960 Marwil ................. E21B 21/065
                                                                175/217
3,357,567 A   12/1967 Wake
(Continued)

*Primary Examiner* — Krishnan S Menon
*Assistant Examiner* — Ryan B Huang
(74) *Attorney, Agent, or Firm* — Adolph Locklar (57) ABSTRACT

A system may include a catch tray coupled with a flow distributor. A mesh screen and carriage may be positioned within the catch tray. A drive bar may be coupled with the carriage and a pitman arm. A gear box may be coupled with a motor and the pitman arm. A process may include distributing contaminated fluid onto the mesh screen. A screen plane of the mesh screen may be at a screen angle that is oblique relative to the direction of the force of gravity. The screen plane is defined by a top surface of the mesh screen. The process may include moving the carriage in a reciprocating linear motion by rotating the pitman arm, and spraying a liquid onto the mesh screen. Liquid may flow through the mesh screen forming clarified liquid, and contaminate may move along the top of the mesh screen to a contaminate outlet.

32 Claims, 4 Drawing Sheets

(51) Int. Cl.
*B01D 29/96* (2006.01)
*C02F 101/32* (2006.01)
*C02F 101/20* (2006.01)
*C02F 101/10* (2006.01)
*C02F 101/22* (2006.01)
*C02F 103/10* (2006.01)
*C02F 103/36* (2006.01)
*C02F 103/28* (2006.01)
*C02F 103/32* (2006.01)
*C02F 103/20* (2006.01)
*C02F 103/00* (2006.01)

(56) References Cited

U.S. PATENT DOCUMENTS

| | | | |
|---|---|---|---|
| 3,607,399 A | 9/1971 | Hanselmann | |
| 3,656,493 A | 4/1972 | Black et al. | |
| 3,855,118 A | 12/1974 | Mikolajczyk | |
| 3,864,249 A * | 2/1975 | Wallis | B01D 35/20 209/1 |
| 3,907,525 A * | 9/1975 | King | B01D 50/00 126/299 E |
| 4,261,831 A | 4/1981 | Linsenmeyer | |
| 4,261,920 A | 4/1981 | Fuchs et al. | |
| 4,412,920 A | 11/1983 | Bolton et al. | |
| 4,437,982 A | 3/1984 | Wasson | |
| 4,468,325 A | 8/1984 | Yock et al. | |
| 4,661,253 A | 4/1987 | Williams | |
| 4,682,613 A | 7/1987 | DeLoach | |
| 4,705,055 A | 11/1987 | Rohm et al. | |
| 5,203,998 A * | 4/1993 | Benian | B01D 29/21 210/493.5 |
| 5,259,955 A | 11/1993 | Bolton | |
| 5,400,812 A | 3/1995 | MacFarlane | |
| 5,425,876 A | 6/1995 | Rector | |
| 5,439,592 A * | 8/1995 | Bellos | B01D 17/085 210/639 |
| 5,459,759 A | 10/1995 | Schilling | |
| 5,462,673 A | 10/1995 | Piers | |
| 5,470,472 A | 11/1995 | Baird et al. | |
| 5,769,956 A | 6/1998 | Cord et al. | |
| 5,860,361 A | 1/1999 | Nanjyo et al. | |
| 6,129,099 A | 10/2000 | Foster et al. | |
| 6,174,382 B1 | 1/2001 | Cord et al. | |
| 6,186,340 B1 | 2/2001 | Hirs | |
| 6,187,197 B1 * | 2/2001 | Haddock | B01D 61/022 204/542 |
| 6,234,080 B1 | 5/2001 | Tani | |
| 6,354,442 B1 * | 3/2002 | Obst | B01D 29/01 210/353 |
| 6,976,592 B1 | 12/2005 | Svehaug | |
| 7,014,758 B2 * | 3/2006 | Nagaoka | B01D 24/14 210/209 |
| 7,431,165 B1 * | 10/2008 | Svehaug | B01D 29/01 210/411 |
| 7,727,389 B1 | 6/2010 | Mallonee et al. | |
| 7,732,840 B2 | 6/2010 | Matsuoka et al. | |
| 7,947,176 B1 | 5/2011 | Jamieson et al. | |
| 8,137,567 B1 | 3/2012 | Moe | |
| 8,137,550 B1 | 5/2012 | Moe | |
| 8,202,336 B1 | 6/2012 | Moe et al. | |
| 8,216,459 B2 | 7/2012 | Mallonee et al. | |
| 8,308,956 B1 | 11/2012 | Jamieson et al. | |
| 8,337,577 B1 | 12/2012 | Moe et al. | |
| 2003/0141245 A1 * | 7/2003 | Fetterman | C05F 3/00 210/609 |
| 2005/0037109 A1 * | 2/2005 | Soerensen | A23J 1/002 426/56 |
| 2008/0069681 A1 * | 3/2008 | Halper | B65G 57/03 414/791.6 |
| 2011/0233144 A1 * | 9/2011 | McCabe | B01D 19/0036 210/748.16 |
| 2012/0301800 A1 * | 11/2012 | Carew | A01K 63/045 429/416 |

* cited by examiner

WATER RECLAMATION SYSTEM AND METHOD

CROSS-REFERENCE TO RELATED APPLICATIONS

Not applicable.

FIELD

Embodiments of the present disclosure generally relate to systems and methods for the separation of liquids from contaminates. More particularly, the present disclosure relates to systems and method for the separation of water from contaminates for production of clarified water.

BACKGROUND

Contaminated water has the potential of polluting the environment. Reuse of previously contaminated water may reduce demand on other sources of water.

SUMMARY

The present disclosure provides for a system. The system includes a catch tray and a flow distributor. The flow distributor includes an inlet and an outlet, and is coupled with the catch tray. The system includes a mesh screen within the catch tray, and a carriage within the catch tray. The carriage includes conduits with nozzles. A drive bar is coupled with the carriage and with a pitman arm. A gear box is coupled with a motor and the pitman arm.

The present disclosure provides for a process. The process includes distributing a contaminated fluid containing liquid and contaminate onto a top of a mesh screen. The mesh screen is positioned in a catch tray. A screen plane of the mesh screen is at a screen angle that is oblique relative to the direction of the force of gravity. The screen plane is defined by a top surface of the mesh screen. The process includes moving a carriage within the catch tray in a reciprocating linear motion. The carriage includes conduits with nozzles. Moving the carriage includes rotating a pitman arm coupled to a drive bar. The drive bar is coupled with the carriage. The process includes spraying a liquid onto a bottom of the mesh screen from the nozzles of the carriage. The liquid of the contaminated fluid flows through the mesh screen forming clarified liquid. The clarified liquid flows through a clarified liquid outlet in the catch tray. The contaminate moves along the top of the mesh screen to a contaminate outlet of the catch tray.

The present disclosure provides for a process. The process includes distributing a contaminated fluid containing liquid and contaminate onto a top of a mesh screen from an outlet of a flow distributor. The mesh screen is positioned in a catch tray, and the flow distributor includes an inlet and is coupled with the catch tray. A screen plane of the mesh screen is at a screen angle that is oblique relative to the direction of the force of gravity. The screen plane is defined by a top surface of the mesh screen. The process includes moving a carriage within the catch tray in a reciprocating linear motion. The carriage includes conduits with nozzles. Moving the carriage includes rotating a pitman arm coupled to a drive bar. The drive bar is coupled with the carriage and a gear box. The gear box is coupled with a motor. The process includes spraying a liquid onto a bottom of the mesh screen from the nozzles of the carriage. The liquid of the contaminated fluid flows through the mesh screen forming clarified liquid. The clarified liquid flows through a clarified liquid outlet in the catch tray. The contaminate moves along the top of the mesh screen to a contaminate outlet of the catch tray.

BRIEF DESCRIPTION OF DRAWINGS

The present disclosure may be understood from the following detailed description when read with the accompanying figures.

DETAILED DESCRIPTION

A detailed description will now be provided. The following disclosure includes specific embodiments, versions and examples, but the disclosure is not limited to these embodiments, versions or examples, which are included to enable a person having ordinary skill in the art to make and use the disclosure when the information in this application is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Figure 1:
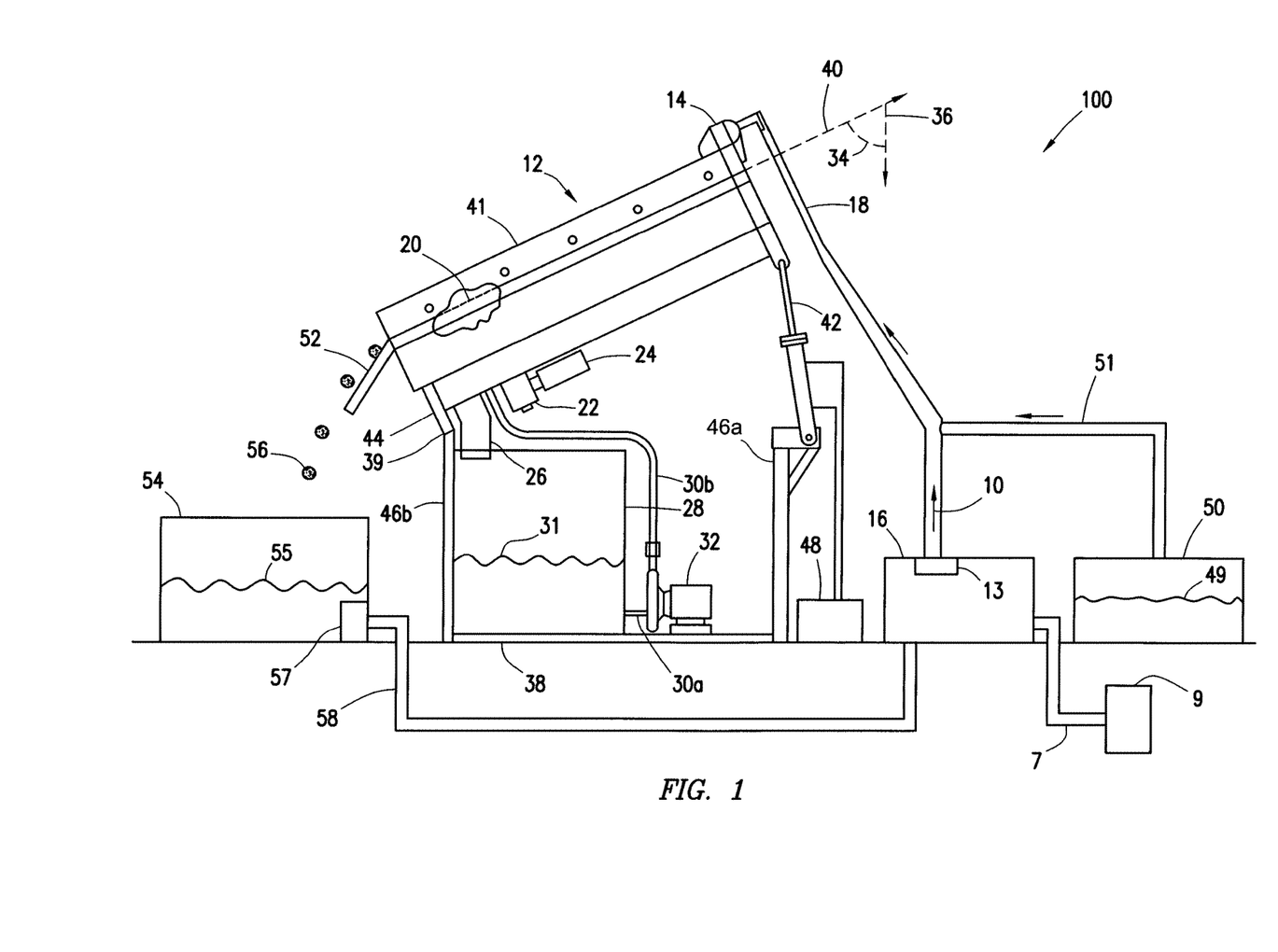
FIG. 1 depicts a system in accordance with certain embodiments.

Certain embodiments of the present disclosure relate to a reclamation system. With reference to FIG. 1, reclamation system 100 may be used for reclamation of contaminated fluid 10.

Reclamation system 100 includes catch tray 12. In some embodiments, one or more portions of catch tray 12 are formed of steel, such as stainless steel. Flow distributor 14 may be positioned on or proximate to catch tray 12. In some embodiments, flow distributor 14 is formed of steel, such as stainless steel. Flow distributor 14 may be coupled with catch tray 12. An inlet 15 (shown in FIG. 2) of flow distributor 14 may be in fluid communication with contaminated fluid supply 16, such as through riser 18. Contaminated fluid supply 16 may supply flow distributor 14 with contaminated fluid 10. For example and without limitation, contaminated fluid supply 16 may include pump 13 (e.g., centrifugal pump) for pumping contaminated fluid 10 into inlet 15 of flow distributor 14.

Flow distributor 14 may distribute contaminated fluid 10 onto mesh screen 20 of reclamation system 100. Mesh screen 20 may be a 40 mesh (420 µm) screen or smaller, a 60 mesh (250 µm) screen or smaller, or an 80 mesh (177 µm)

screen or smaller. In some embodiments, mesh screen 20 is formed of steel, such as stainless steel. Mesh screen 20 may be positioned within catch tray 12 and below outlet 17 (shown in FIG. 2) of flow distributor 14. In some embodiments, mesh screen 20 is static, such that mesh screen 20 is not vibrated, lifted, lowered, moved laterally, moved longitudinally, or otherwise moved during reclamation of contaminated fluid 10. In some embodiments, mesh screen 20 is not static. In such embodiments, mesh screen 20 may be vibrated, lifted, lowered, moved laterally, moved longitudinally, or otherwise moved during reclamation of contaminated fluid 10. In some embodiments, cover 41 is coupled with catch tray 12 and positioned above mesh screen 20. In some embodiments, cover 41 is formed of steel, such as stainless steel.

Carriage 60 (shown in FIG. 3A) may be located within catch tray 12 below mesh screen 20. Carriage 60 may be moved in a reciprocating linear motion by gear box 22 coupled with motor 24, as detailed in FIGS. 3A and 3B.

Figure 3A:
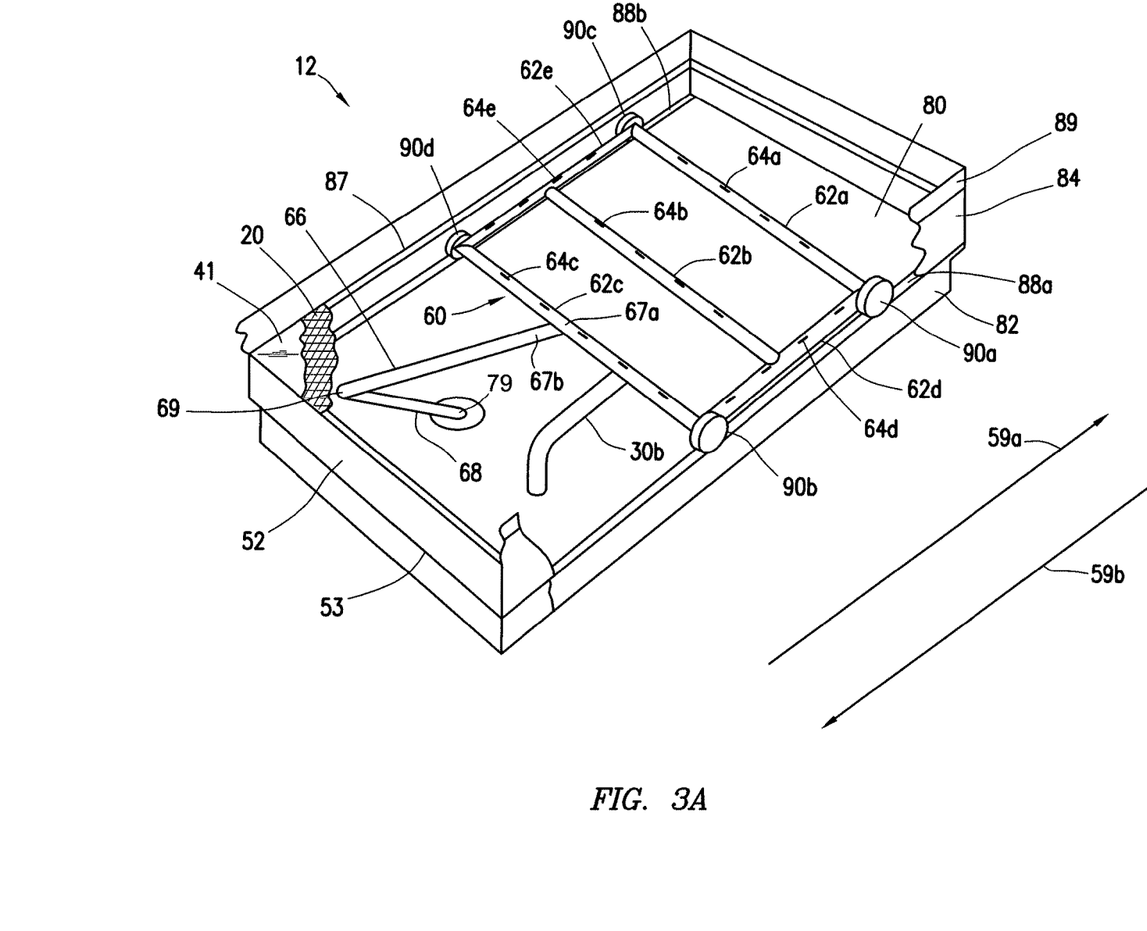
FIG. 3A depicts a catch tray with a carriage in accordance with certain embodiments.

Catch tray 12 may include clarified liquid outlet 26 in fluid communication with clarified liquid tank 28. Clarified liquid outlet 26 may be positioned in catch tray 12 such that gravity causes clarified liquid 31 to flow to and out of clarified liquid outlet 26. In some embodiments, one or more conduits 62a-62d and one or more nozzles 64a-64d of carriage 60 (shown in FIG. 3A) are in fluid communication with clarified liquid tank 28, such as through conduits 30a and 30b, which may be rigid or flexible pipes, for example. Clarified liquid tank 28 may provide clarified liquid 31 (e.g., clarified water) to one or more conduits 62a-62d and one or more nozzles 64a-64d of carriage 60, as discussed in more detail below. For example and without limitation, pump 32 (e.g., centrifugal pump) may pump clarified liquid 31 from clarified liquid tank 28, through conduits 30a and 30b, to one or more conduits 62a-62d and one or more nozzles 64a-64d of carriage 60 (as shown in FIG. 3A). In some embodiments, conduits 62a-62d are formed of steel (e.g., stainless steel) or polyvinylchloride (PVC).

In some embodiments, mesh screen 20 is positioned such that a top surface of mesh screen 20 defines a plane, screen plane 40. Screen plane 40 may be at screen angle 34 that is oblique relative to the direction of the force of gravity 36. Screen angle 34 may range from greater than 0° to less than 90°, from 10° to 80°, from 20° to 70°, from 30° to 60°, from 40° to 50°, from greater than 90° to less than 180°, from 100° to 170°, from 110° to 160°, from 120° to 150°, or from 130° to 140°. For example and without limitation, support structure 38 may support catch tray 12 such that screen plane 40 is at screen angle 34. In some embodiments, support structure 38 includes extendable support 42 coupled with catch tray 12 and with a static portion of support structure 46a. For example and without limitation, extendable support 42 may be bolted to catch tray 12 and to static portion of support structure 46a. Support structure 38 may include pivotable support 44 coupled with catch tray 12 and with static portion of support structure 46b. For example and without limitation, pivotable support 44 may be bolted to catch tray 12 and to static portion of support structure 46b. In certain embodiments, extendable support 42 is a hydraulic cylinder or a pneumatic cylinder coupled with controller 48, which may include an actuator and a hydraulic fluid source or pneumatic fluid source. In certain embodiments, pivotable support 44 is a pivot bracket. Pivotable support 44 may allow catch tray 12 to pivot about pivot point 39. In some embodiments, one or more portions of support structure 38 are formed of steel, such as stainless steel.

In some embodiments, screen angle 34 relative to the direction of the force of gravity 36 may be changed by adjusting a position of catch tray 12. For example and without limitation, extendable support 42 may extend or retract to lift one end of catch tray 12, while pivotable support 44 allows the other end of catch tray 12 to pivot. Such a change in the position of catch tray 12 may result in a change in screen angle 34.

Reclamation system 100 may include chemical additive injector 50 in fluid communication with inlet 15 of fluid distributor 14, such as through conduit 51, which may be a flexible or rigid pipe, and riser 18.

Catch tray 12 may include contaminate outlet 52, such as a chute. Separator 54 may be positioned to receive contaminate 56 from contaminate outlet 52. For example and without limitation, contaminate 56 may slide from contaminate outlet 52 and fall into separator 54. In certain embodiments, separator 54 may be a roll press, a plate press, a centrifuge, or a shaker screen. In some embodiments, contaminated fluid supply 16 and/or inlet 15 of flow distributor 14 is in fluid communication with separator 54, such as through conduit 58, which may be a flexible or rigid pipe. Separator 54 may include pump 57 (e.g., centrifugal pump) for pumping separated, remaining liquid 55 from separator 54 to contaminated fluid supply 16 and/or inlet 15 of flow distributor 14.

In some embodiments, reclamation system 100 includes an oil-water separator 9 upstream of flow distributor 14. Oil-water separator 9 may be in fluid communication with flow distributor 14, such as via conduit 7 through contaminated fluid supply 16. For example and without limitation, oil-water separator 9 may be an (America Petroleum Institute) API oil-water separator. Contaminated fluid 10 may flow through oil-water separator 9 prior to being distributed onto mesh screen 20, such as upstream of flow distributor 14, or upstream of flow distributor 14 and contaminated fluid supply 16. Oil-water separator 9 may separate at least some oil from contaminated fluid 10.

Figure 2:
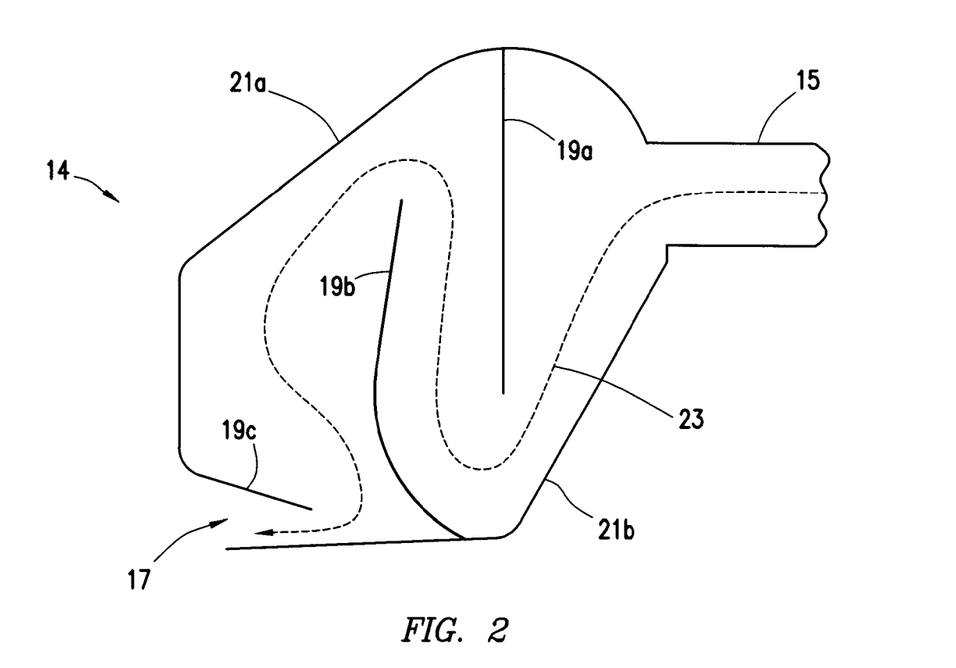
FIG. 2 depicts a flow distributor in accordance with certain embodiments.

FIG. 2 depicts a cut away view of the flow distributor 14 in accordance with certain embodiments. Flow distributor 14 may include inlet 15. Inlet 15 may receive contaminated fluid 10 from contaminated fluid supply 16. Flow distributor 14 may include outlet 17. Outlet 17 may distribute contaminated fluid 10 onto mesh screen 20. Outlet 17 may be in contact with mesh screen 20, or outlet 17 may be posited above mesh screen 20. Outlet 17 may have a width equal to or within 10% or 20% of the width of mesh screen 20 for distributing contaminated fluid 10 across the width of mesh screen 20.

One or more baffles 19a-19c may be located within flow distributor 14 between inlet 15 and outlet 17. Baffles 19a-19c may extend from alternating walls 21a and 21b of flow distributor 14, as depicted. Baffles 19a-19c may include linear baffles, such as baffle 19a; arc baffles, such as baffle 19b; angled baffles, such as baffle 19c; or combinations thereof. While depicted as having three baffles 19a-19c, flow distributor 14 may include any number of baffles, including no baffles. For example, flow distributor 14 may include from 1 to 10 baffles. In some embodiments, flow distributor 14 does not contain any baffles. Baffles 19a-19c force contaminated fluid 10 to flow through flow distributor 14 along flow path 23, which results in mixing of contaminated fluid 10 prior to being distributed across mesh screen 20. For example and without limitation, contaminated fluid 10 may be forced below baffles 19a, and forced to rise above a height of baffle 19b before passage further along flow path 23 to contact baffle 19c and exit outlet 17.

Figure 3B:
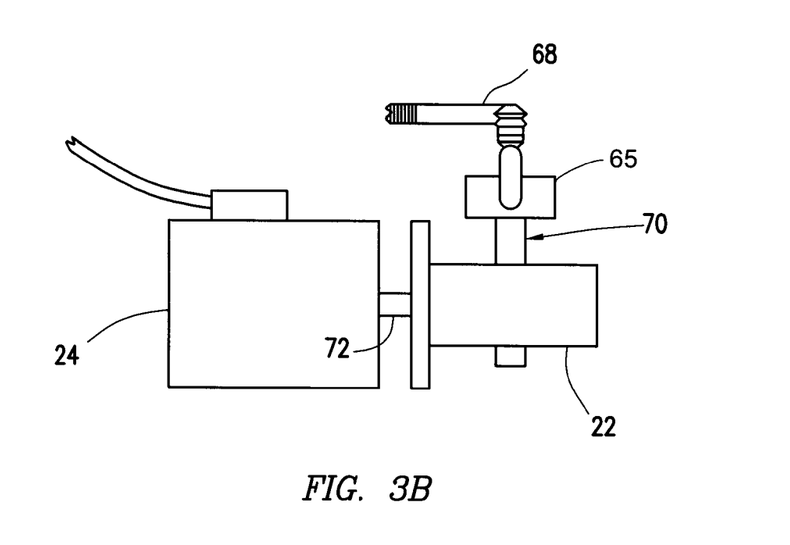
FIG. 3B depicts a motor, gear box and pitman arm in accordance with certain embodiments.

FIG. 3A depicts a detail of carriage 60 within catch tray 12, and FIG. 3B depicts a detail of motor 24, gear box 22, and pitman arm 68 that move carriage 60.

Carriage 60 may be positioned within catch tray 12, and below mesh screen 20. Carriage 60 may include one or more conduits 62a-62d. While depicted as having five conduits 62a-62e, carriage 60 may include any number of conduits, ranging from one to ten, for example. Carriage 60 may include one or more conduits 62a-62c that extend laterally within catch tray 12, and one or more conduits 62d and 62e that extend longitudinally within catch tray 12. Conduits 62a-62c may extend at an angle relative to the extension of 62d and 62e. For example and without limitation, conduits 62a-62c may extend at an angle relative to the extension of 62d and 62e that is 90°, less than 90°, or greater than 90°. While depicted as having two conduits 62d and 62e that extend longitudinally within catch tray 12, carriage 60 may include more or less than two conduits that extend longitudinally within catch tray 12. While depicted as having three conduits that extend laterally within catch tray 12, carriage 60 may include one, two, or more than three conduits that extend laterally within catch tray 12.

Each conduit 62a-62d may include one or more nozzles 64a-64e. Conduits 62a-62e may be in fluid communication with conduit 30b, which may be a flexible pipe or tubing, for example. Conduits 62a-62d may be in fluid communication with nozzles 64a-64d. For example and without limitation, conduits 62a-62d may be pipes coupled with nozzles 64a-64d.

Drive bar 66 may be coupled with carriage 60. For example and without limitation, drive bar 66 may be pinned to carriage 60 in a manner that allows drive bar 66 to rotate relative to coupling point 67a of drive bar 66 to carriage 60. In some embodiments, a length of drive bar 66 is adjustable. For example and without limitation, drive bar 66 may include one or more additional coupling points 67b, such as a thru-hole for receiving a pin. By coupling drive bar 66 with carriage 60 at different coupling points 67a and 67b, the length of drive bar 66 may be adjusted. In some embodiments, pitman arm 68, drive bar 66, or both are rigid. In some embodiments, pitman arm 68, drive bar 66, or both are formed of steel, such as stainless steel.

Pitman arm 68 may be coupled to drive bar 66. For example and without limitation, pitman arm 68 may be pinned to drive bar 66 via pin 69. Pin 69 may allow movement of pitman arm 68 relative to drive bar 66. Pitman arm 68 may be coupled with gear box 22, such as through shaft 70. Gear box 22 may be coupled with motor 24, such as through shaft 72. Motor 24 may be an electric motor, and may have a variable frequency drive for changing the speed of pitman arm 68 through gear box 22. Shaft 70 may extend through base 80 of catch tray 12 to engage with pitman arm 68. In some embodiments, gear box 22 may be mounted to a bottom of base 80 with mounting plate 65. For example and without limitation, mounting plate 65 may be coupled (e.g., bolted or welded) to a bottom of base 80. In some embodiments one or more of gear box 22, motor 24, mounting plate 65, and shafts 72 and 70 are formed of cast iron or steel (e.g., stainless steel). Operation of motor 24 may rotate shaft 72, which may be operatively coupled with gear box 22. Gear box 22 may rotate shaft 70, which may be operatively coupled with pitman arm 68. Pitman arm 68 may be operatively coupled with drive bar 66. Drive bar 66 may be operatively coupled with carriage 60.

With further reference to FIG. 3A, catch tray 12 may be formed of base 80 coupled with sidewalls 82, 84 and 89. For example, sidewalls 82, 84 and 89 may include lower sidewalls 82, middle sidewalls 84, and upper side walls 89, each of which may span about an entire perimeter of catch tray 12. Middle sidewalls 84 may form a portion of catch tray 12 having a larger width and length than the width and length of the portion of catch tray 12 formed by lower sidewalls 82. Middle sidewalls 84 may connect with lower sidewalls 82 at an internal ledge that forms longitudinal tracks 88a and 88b. Upper sidewalls 89 may form a portion of catch tray 12 having a larger width and length than the width and length of the portion of catch tray 12 formed by middle sidewalls 84. Upper sidewalls 89 may connect with middle sidewalls 84 at an internal ledge 87. The top surface of mesh screen 20 is shown in FIG. 3A. Mesh screen 20 may be supported in catch tray 12 on internal ledge 87.

Cover 41 may be supported on the top of upper sidewalls 89. Cover 41 may reduce the amount liquids or solids that exit catch tray 12, except through clarified liquid outlet 26 and contaminate outlet 52. Cover 41 may be positioned over mesh screen 20. One skilled in the art with the aid of the present enabling disclosure will understand that mesh screen 20 may span across the entire internal area defined by catch tray 12, and that cover 41 may span across a majority of the internal area defined by catch tray 12, with the exception that cover 41 may not block flow distributor 14 from distributing contaminated fluid 10 onto mesh screen 20.

A portion of sidewalls 82, 84 and/or 89 of catch tray 12 may form contaminate outlet 52, which is depicted in a closed position in FIG. 3A, but may be opened as shown in FIG. 1. For example and without limitation, contaminate outlet 52 may be a chute connected via a hinge 53 to catch tray 12.

Carriage 60 may include wheels or rollers 90a-90d in movable contact with tracks 88a and 88b. Wheels or rollers 90a-90d may be coupled with conduits 62a-62e. In some embodiments, wheels or rollers 90a-90d are formed of steel, such as stainless steel.

Figure 4:
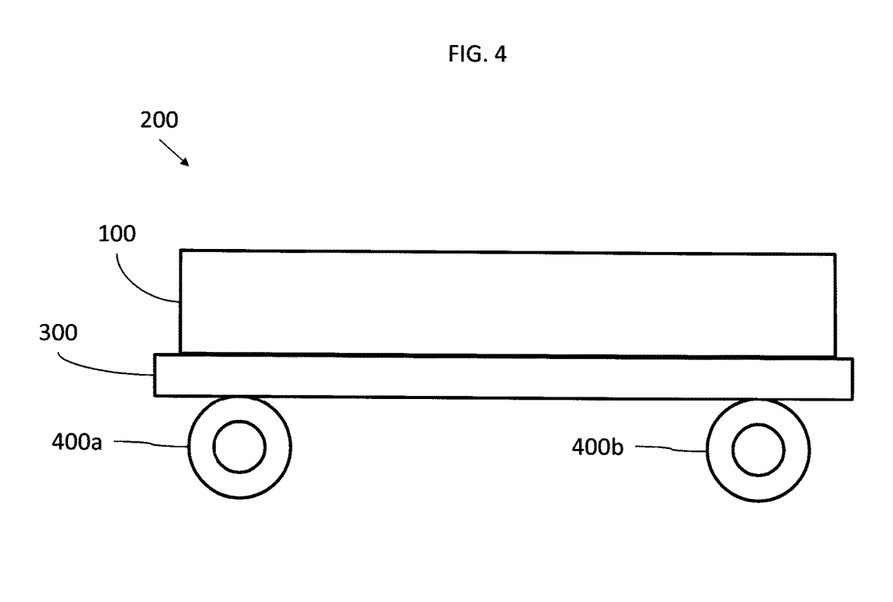
FIG. 4 depicts a mobile system in accordance with certain embodiments.

In some embodiments, reclamation system 100 is a portion of mobile reclamation system 200 that may be transported to remote locations. FIG. 4 depicts mobile reclamation system 200. Mobil reclamation system 200 includes reclamation system 100, as depicted in FIG. 1, mounted on transportation device 300. Transportation device 300 may be a sled, bed, trailer, boat, shipping container, railcar, or any other transportation device known to those of ordinary skill in the art. Reclamation system 100 may be mounted on transportation device 300 in any manner known to those of skill in the art, such as through use of tie downs. In some embodiments, transportation device 300 may include wheels 400a and 400b. For example and without limitation, transportation device 300 with wheels 400a and 400b may be a trailer that may be coupled with a truck or similar vehicle for transportation of reclamation system 100 on a roadway. Transportation device 300 with wheels 400a and 400b may be a railcar for transportation of reclamation system 100 on a railway.

Certain embodiments relate to a reclamation process for reclamation of liquid, such as water. In some embodiments, the reclamation process may be implemented using reclamation system 100 or mobile reclamation system 200 as described herein and depicted in FIGS. 1, 2, 3A, 3B and 4. While the reclamation process is described with reference to FIGS. 1, 2, 3A, 3B and 4, one skilled in the art with the aid of the present disclosure will understand that the reclamation process is not necessarily limited to being performed with reclamation system 100 or mobile reclamation system 200 as depicted in FIGS. 1, 2, 3A, 3B and 4.

With reference to FIGS. 1, 2, 3A, 3B and 4, the reclamation process may include transporting mobile reclamation system 200 to a location for operation of reclamation system 100 on transportation device 300 with wheels 400a and 400b. The reclamation process may include distributing contaminated fluid 10 containing liquid and contaminate 56 onto a top of mesh screen 20. The reclamation process may include supplying contaminated fluid 10 to flow distributor 14 from contaminated fluid supply 16. For example and without limitation, contaminated fluid 10 may be pumped from contaminated fluid source 16 through riser 18 to flow distributor 14. From riser 18, contaminated fluid 10 may pass into inlet 15 of flow distributor 14. Contaminated fluid 10 may flow along flow path 23 past baffles 19a-19c between walls 21a and 21b. Baffles 19a-19c may operate as a static mixer on contaminated fluid 10, resulting in the mixing of contaminated fluid 10. Contaminated fluid 10 may then flow through outlet 17 onto mesh screen 20. Outlet 17 may be positioned to output contaminated fluid 10 onto mesh screen 20. In some embodiments, outlet 17 may distribute contaminated fluid 10 across a full width of mesh screen 20.

The reclamation process may include positioning catch tray 12 such that screen plane 40 is at screen angle 34 relative to the direction of the force of gravity 36. For example and without limitation, extendable support 42 may be extended or retracted to lift one side of catch tray 12, while the other side of catch tray 12 pivots about pivot point 39 on pivotable support 44. Controller 48 may actuate extendable support 42 (e.g., hydraulic or pneumatic cylinder), such as by providing hydraulic or pneumatic fluid thereto or removing hydraulic or pneumatic fluid therefrom. While extendable support 42 extends or retracts and pivotable support 44 allows pivoting of catch tray 12, static portions 46a and 46b of support structure 38 may remain static.

With mesh screen 20 positioned in catch tray 12 such that screen plane 40 is at screen angle 34 relative to the direction of the force of gravity 36, contaminated fluid 10 flows within catch tray 12 from flow distributor 14 towards contaminate outlet 52 and clarified liquids outlet 26. As contaminated fluid 10 flows across mesh screen 20, liquid within contaminated fluid 10 flows through the holes of mesh screen 20, while contaminate 56, which may be solid, moves along the top of mesh screen 20 towards contaminate outlet 52. For example and without limitation, contaminate 56 may slide along the top of mesh screen 20.

In some embodiments, contaminate 56 is a flocculated solid or coagulated solid. While contaminate 56 moves along the top of mesh screen 20, flocculation of contaminate 56 may occur. As used herein "flocculation" refers to colloids within contaminated fluid 10 coming out of suspension or solution and agglomerating into clusters in the form of a flocculated solid (floc or flake). The floc or flake formed by flocculation may be larger than the holes in mesh screen 20, such that contaminate 56 cannot flow through mesh screen 20.

Clarified liquid 31 that flows through the holes of mesh screen 20 exits catch tray 12 through clarified liquid outlet 26. The reclamation process may include collecting clarified liquid 31 in clarified liquid tank 28 that is in fluid communication with clarified liquid outlet 26.

The reclamation process may include supplying contaminate 56 from contaminate outlet 52 to separator 54, and separating remaining liquid 55 from contaminate 56 using separator 54. The reclamation process may include recycling separated remaining liquid 55 from separator 54, and distributing separated remaining liquid 55 with contaminated fluid 10 onto the top of mesh screen 20. For example and without limitation, remaining liquid 55 may be pumped to contaminated fluid source 16 through conduit 58.

In some embodiments, the reclamation process includes combining contaminated fluid 10 with chemical additive 49 upstream of mesh screen 20. For example and without limitation, chemical additive 49 may be injected from chemical additive injector 50. Chemical additive 49 may flow from chemical additive injector 50, through conduit 51, into riser 18, and to flow distributor 14. Chemical additive 49 may be a chemical or composition that affects an ionic charge transfer in contaminated fluid 10. Chemical additive 49 may contain a flocculant, a coagulant, prehydrated bentonite, prehydrated bentonite with barite, an acid, a base, a biocide, a gel breaker, surfactant, or combinations thereof. As used herein, a "flocculant" is a chemical or composition that causes colloids within contaminated fluid 10 to come out of suspension or solution and agglomerate into clusters in the form of a floc or flake. One skilled in the art with the aid of the present enabling disclosure would be able to select the appropriate flocculant for use herein, depending upon the particular contaminated fluid 10. Flocculants may include dry or emulsion polymers. Flocculants may include cationic flocculants and anionic flocculants. Examples of cationic flocculants include, but are not limited to, those based on copolymers of N,N-dimethylaminoethyl acrylate methyl chloride quaternary, N,N-dimethylaminoethyl methacrylate methyl chloride quaternary, and acrylamide, commercially available from CHEMTREAT®. Examples of anionic flocculants include, but are not limited to, those based on copolymers of acrylamide and acrylic acid, commercially available from CHEMTREAT®. As used herein, a "coagulant" is a chemical or composition that neutralizes negative electrical charge on particles within contaminated fluid 10, which destabilizes the forces that keep colloids apart. Coagulants may include organic coagulants and inorganic coagulants. Examples of coagulants include, but are not limited to, aluminum salts, iron salts, and polyelectrolytes, which are commercially available from CHEMTREAT®. Examples of organic coagulants include, but are not limited to, polyamine, polydiallyldimethylammonium chloride (also referred to as polyDADMAC), melamine formaldehydes, and tannins, which are commercially available from CHEMTREAT®. Examples of inorganic coagulants include, but are not limited to, aluminum sulfate, aluminum chloride, polyaluminum chloride and aluminum chlorohydrate, ferric sulfate and ferrous sulfate, and ferric chloride. The coagulant may cause heavy metals present in contaminated fluid 10 to coagulate. The prehydrated bentonite may assist in removal of hydrocarbons and coagulated heavy metals from mesh screen 20. As used herein, a "biocide" is a chemical or composition that acts to inhibit or kill organisms present in contaminated fluid 10, such as microorganisms (e.g. bacteria). For example and without limitation, the biocide may be a preservative, disinfectant, pesticide, or insecticide. As used herein, a "gel breaker" is a chemical or composition that reduces the viscosity of contaminated fluid 10, such as by breaking long-chain molecules into shorter segments. Gel breakers may be useful when contaminated fluid 10 is a frac fluid. Acids and bases well known to those skilled in the art may be used to adjust the pH of contaminated fluid 10. While only a single chemical additive injector 50 is shown, one skilled in the art with the aid of the present enabling disclosure will understand that reclamation system 100 may include more than one chemical additive injector 50. For example and without limitation, reclamation system 100 may include a separate chemical additive injector 50 for each different chemical or composition that is injected into flow distributor 14.

In some embodiments, chemical additive injector 50 is an automatic flocculant makedown/injector system for making and injecting flocculant. For example and without limitation, commercially available flocculant makedown/injector systems include those sold by Clearwater Industries, Inc., of Milwaukee, Wis., including Models 50, 150, 300, 300 Big Bag SS, 330, 500, 500 stainless steel, 511, 512, 522, 800, 800 stainless steel, and 300 Big Bag.

In some embodiments, the reclamation process includes passing contaminated fluid 10 through oil-water separator 9 upstream of flow distributor 14, which may separate at least some oil from contaminated fluid 10.

In some embodiments contaminated fluid 10 is a liquid-solid suspension or a solution. In some embodiments, contaminated fluid 10 is a slurry, such as a flocculated aqueous slurry. Contaminated fluid 10 may be a drilling mud, an air drilling misting fluid, produced water, frac fluid, washdown water from an oil refinery or petrochemical plant, wastewater from an oil refinery or petrochemical plant, dredged slurry, sewage slurry, paper pulp slurry, wine dreg slurry, wastewater from a factory, mixtures of water and bedding from an animal farm, slurry obtained by cleaning a sewer pipe, slurry obtained by cleaning a pipeline, or contaminated water from a body of water. As known to those skilled in the art, a "drilling mud" is a mixture of liquids and solids (e.g., solid suspension) used in operations to drill boreholes. The drilling mud may be static or active water based drilling mud, or static or active brine based drilling mud used in any method of drilling including horizontal drilling. "Air drilling misting fluid" is liquid used in mist drilling. "Produced water" is water produced from a wellbore that is not a treatment fluid. "Frac fluid" is fluid injected into a well to stimulate fracturing within the well. "Washdown water from an oil refinery or petrochemical plant" refers to water previously used to wash equipment at an oil refinery or petrochemical plant. "Wastewater from an oil refinery or petrochemical plant" refers to water previously used in processing and/or cooling at an oil refinery or petrochemical plant. "Mixtures of water and bedding from an animal farm" refers to bedding (e.g., hay) mixed with liquids (e.g., animal waste). After being processed in reclamation system 100, liquid and bedding may be reused at a farm. "Dredged slurry" refers to the slurry formed by dredging a body of water. After being processed in reclamation system 100, clarified liquid may be returned to the body of water. "Sewage slurry" refers to a mixture of sewage and water, such as from a municipal sanitation facility. "Paper pulp slurry" refers to a mixture of paper and water used in the production of paper. "Wine dreg slurry" refers to a slurry of organic matter (e.g., grapes) and water. "Wastewater from a factory" refers to water previously used in processing and/or cooling at a factory. "Slurry obtained by cleaning a sewer pipe" refers to a mixture of sewage and cleaning liquids obtained from the cleaning of a sewer pipe. "Slurry obtained by cleaning a pipeline" refers to a mixture of solids and cleaning liquids obtained from the cleaning of a pipeline that is not a sewer pipe. "Contaminated water from a body of water" may be water from a natural or artificial body of water that has been contaminated, such as with oil, hydrocarbons other than oil, chemicals other than hydrocarbons (e.g., heavy metals), or sewage. After passing through reclamation system 100, clarified water may be returned to the body of water. For example and without limitation, the body of water may be a lake, river, ocean, canal, ditch, pond (e.g., retention pond), or bayou.

In some embodiments, liquid of contaminated fluid 10 is water, such that clarified liquid 31 is clarified water.

In some embodiments, contaminate 56 includes particles having a particle size $D_{50}$, or $D_{90}$, or $D_{99}$, or $D_{100}$ that is 1 μm or less. In some embodiments, contaminate 56 includes particles having a particle size $D_{50}$, or $D_{90}$, or $D_{99}$, or $D_{100}$ that is 1 μm or more. The particles of contaminate 56 may be subjected to flocculation on mesh screen 20, resulting in the agglomeration of the particles such that agglomerates of the particles have a particle size $D_{50}$, or $D_{90}$, or $D_{99}$, or $D_{100}$ that is larger than the holes in mesh screen 20 and cannot pass through mesh screen 20.

Contaminate 56 of contaminated fluid 10 may be metal, bacteria, oil, or hydrocarbons other than oil. For example and without limitation, contaminate 56 may be arsenic, cadmium, mercury, lead, chromium, iron sulfide, iron oxide, entrained hydrocarbons, or combinations thereof.

In some embodiments clarified liquid 31 is water containing less than 1000, 700, 500 or 300 ppm hydrocarbons. For example and without limitation, when contaminated fluid 10 contains contaminate 56 that is oil or another hydrocarbon in amounts greater than 300 ppm, reclamation system 100 and reclamation process may filter contaminated fluid 10 such that clarified liquid 31 is water containing less than 300 ppm hydrocarbons. Without being bound by theory, it is believed that in embodiments in which contaminate 56 is oil and the liquid of contaminated fluid 10 is water, the differential of surface tension between oil and water may allow the oil to move over the top of mesh screen 20 while the water passes through the holes of mesh screen 20.

In some embodiments, clarified liquid 31 has a reduced chemical oxygen demand (COD), reduced biological oxygen demand (BOD), or both relative to the COD and BOD of contaminated fluid 10. As used herein, "BOD" refers to a measurement of the amount of dissolved oxygen need by aerobic biological organisms in a liquid (e.g., water). As used herein, "COD" refers to a measurement of the amount of chemicals and compounds capable of being oxidized in a liquid (e.g., water).

In some embodiments, the reclamation process includes determining if contaminated fluid 10 has a solids content of 10 weight percent or more, or 5 weight percent or more, or 3 weight percent or more, such as by any method well known to those of ordinary skill in the art. For example, solids content may be measured in accordance with ASTM C1603. If contaminated fluid 10 is determined to have a solids content of 10 weight percent or more, or 5 weight percent or more, or 3 weight percent or more, the reclamation process may then include mechanically separating a portion of solids from contaminated fluid 10 prior to distributing contaminated fluid 10 on the top of mesh screen 20 until contaminated fluid 10 has a solids content of less than 10 weight percent, or less than 5 weight percent, or less than 3 weight percent. Mechanical separation may be performed by filtering, for example.

The reclamation process may include moving carriage 60 that is below mesh screen 20 within catch tray 12 in a reciprocating linear motion within catch tray 12. For example and without limitation, carriage 60 may reciprocally move within catch tray 12 in a first direction 59a and a second direction 59b. Moving carriage 60 may include operating motor 24 and gear box 22 to rotate pitman arm 68 about rotation point 79. Rotation of pitman arm 68 is translated into reciprocal linear motion via drive bar 66. As pitman arm 68 rotates (e.g., away from contaminate outlet 52, as depicted), drive bar 66 moves in first direction 59a, thereby, forcing carriage 60 to move in first direction 59a. As pitman arm 68 continues to rotate (e.g., towards contaminate outlet 52, as depicted), drive bar 66 moves in second direction 59b, thereby, forcing carriage 60 to move in second direction 59b. The speed of movement of carriage 60 may be adjusted by adjusting the variable speed drive of motor 24. Carriage 60 moves within catch tray 12 by rolling on wheels or rollers 90a-90c. Wheels or rollers 90a-90c roll along tracks 88a and 88b. Carriage 60 may be positioned such that a space is located between carriage 60 and base 80 of catch tray 12.

The reclamation process includes spraying a liquid, such as water, onto a bottom of mesh screen 20 from nozzles 64a-64d of carriage 60. For example and without limitation, liquid may flow into conduits 62a-62d of carriage 60 from conduit 30b. The liquid may then flow through conduits 62a-62d and out of nozzles 64a-64d. The liquid spraying out of nozzles 64a-64d may be directed towards the bottom of mesh screen 20. In some embodiments, nozzles 64a-64d are static. Static nozzles 64a-64d do not rotate, swivel, or otherwise move relative to conduits 62a-62d. In some embodiments, nozzles 64a-64d are not static. In some embodiments, the liquid that is sprayed from nozzles 64a-64d is clarified liquid 31.

In operation, when catch tray 12 is positioned such that screen plane 40 is at screen angle 34 relative to the direction of the force of gravity 36, carriage 60 may move upwards relative to gravity along tracks 88a and 88b and towards flow distributor 14. As carriage 60 moves upwards, liquid sprayed from carriage 60 may clean mesh screen 20 by loosening any stuck solids within holes of mesh screen 20. Also, as carriage 60 moves upwards, liquid sprayed from carriage 60 may lift at least some contaminate 56 (e.g., floc or flake) to a position above mesh screen 20, such that contaminate 56 is at least temporarily suspended above mesh screen 20. Such loosening and lifting, in conjunction with gravity, assists contaminate 56 in movement along the top of mesh screen 20 towards contaminate outlet 52, and reduces or eliminates passage of contaminate 56 through mesh screen 20. Carriage 60 may move downwards relative to gravity along tracks 88a and 88b and towards contaminate outlet 52. As carriage 60 moves downward, the liquid sprayed from carriage 60 may clean mesh screen 20 by loosening any stuck solids within holes of mesh screen 20. Also, as carriage 60 moves downward, the liquid sprayed from carriage 60 may force (e.g., sweep) contaminate 56 on the top of mesh screen 20 to move (e.g., slide) downwards along mesh screen 20 and towards contaminate outlet 52. Carriage 60 may move along the entire interior length or substantially the entire interior length of catch tray 12 along first and second directions 59a and 59b, such that nozzles 64a of conduit 62a may spray liquid on the bottom of mesh screen 20 at one end, and nozzles 64c of conduit 62c may spray liquid on the bottom of mesh screen 20 at the opposite end. Nozzles 64d and 64e of conduits 62d and 62e may spray liquid on the bottom of mesh screen 20 from one end to the opposite end. In such embodiments, nozzles 64a-64e of conduits 62a-62e may continuously or intermittently spray liquid on the entire planar surface of the bottom of mesh screen 20.

The liquid of contaminated fluid 10 flows through mesh screen 20 forming clarified liquid 31, which flows through clarified liquid outlet 26 in catch tray 12. In certain embodiments, clarified liquid 31, which may be reclaimed water, may be used as makeup water. For example and without limitation, reclaimed water may be used in: frac fluid; drilling fluid; potable water; production of paper; production of wine; and processes at factories, oil refineries, and chemical plants.

In some embodiments the reclamation process includes clarifying contaminated fluid 10 at a rate of from 500 to 12,000 gallons per minute (gpm), or from 500 to 3,000 gpm. For example and without limitation, reclamation system 100 may have a capacity for clarifying contaminated fluid 10 at a rate of from 500 to 3,000 gpm, 1,000 to 3,000 gpm, or 2,000 to 3,000 gpm. In some embodiments, multiple reclamation systems 100 may be used (e.g., in parallel and/or series), providing a capacity for clarifying contaminated fluid 10 at a rate of from 500 to 12,000 gpm, 1,000 to 12,000 gpm, 2,000 to 12,000 gpm, or 3,000 to 12,000 gpm. In some embodiments, the reclamation process is a continuous reclamation process in which contaminated fluid 10 is continuously provided to the top of mesh screen 20 and clarified as described herein, as opposed to a batch reclamation process in which discrete batches of contaminated fluid 10 are intermittently provided to the top of mesh screen 20 and clarified as described herein. In some embodiments, the reclamation process is a batch reclamation process.

"Gravity" as used herein refers to the gravity of the Earth.

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples. Other and further embodiments, versions and examples of the disclosure may be devised without departing from the basic scope thereof and the scope thereof is determined by the claims that follow.

What is claimed is:

1. A system comprising:
   a catch tray;
   a flow distributor comprising an inlet and an outlet, wherein the flow distributor is coupled with the catch tray;
   a mesh screen within the catch tray, the mesh screen comprising 80 mesh or smaller, wherein the value of mesh is determined by the number of openings per linear inch, wherein the mesh screen is static during a reclamation of contaminated fluids operation;
   a chemical additive injector, the chemical additive injector in fluid communication with the inlet of the fluid distributor;
   a carriage within the catch tray, wherein the carriage comprises one or more conduits with one or more nozzles;
   a drive bar coupled with the carriage; and
   a pitman arm coupled with the drive bar and with a gear box, wherein the gear box is coupled with a motor, and wherein the pitman arm is adapted to move the carriage within the catch tray in a reciprocating motion during the reclamation of contaminated fluids operation.

2. The system of claim 1, wherein a length of the drive bar is adjustable.

3. The system of claim 1, wherein the catch tray comprises tracks, and wherein the carriage comprises wheels or rollers movably coupled on the tracks.

4. The system of claim 1, wherein the carriage comprises at least two conduits that extend in a first direction, each conduit with one or more nozzles, and at least two conduits that extend in a second direction, each conduit with one or more nozzles, wherein the first direction is perpendicular to the second direction.

5. The system of claim 1, wherein the catch tray comprises a clarified liquid outlet in fluid communication with a clarified liquid tank, where the clarified liquid tank is in fluid communication with a body of water.

6. The system of claim 5, wherein the one or more conduits with the one or more nozzles are in fluid communication with the clarified liquid tank.

7. The system of claim 1, wherein the flow distributer comprises one or more baffles located within the flow distributor between the inlet and the outlet.

8. The system of claim 1, wherein the inlet of the flow distributer is in fluid communication with a contaminated fluid supply.

9. The system of claim 1, wherein the mesh screen is positioned such that a screen plane is at a screen angle that is oblique relative to the direction of the force of gravity, wherein the screen plane is a plane defined by the top surface of mesh screen.

10. The system of claim 9, further comprising a support structure supporting the catch tray.

11. The system of claim 10, wherein the support structure comprises an extendable support coupled with the catch tray, and a pivotable support coupled with the catch tray.

12. The system of claim 11, wherein the extendable support comprises a hydraulic cylinder or a pneumatic cylinder, and wherein the pivotable support comprises a pivot bracket.

13. The system of claim 1, wherein the catch tray further comprises a contaminate outlet.

14. The system of claim 13, further comprising a separator positioned to receive contaminate from the contaminate outlet.

15. The system of claim 14, wherein the separator is a roll press, a plate press, a centrifuge, or a shaker screen.

16. The system of claim 15, wherein the inlet of the flow distributer is in fluid communication with a contaminated fluid supply, and wherein the separator is in fluid communication the contaminated fluid supply.

17. The system of claim 1, wherein the system is a mobile system.

18. The system of claim 1, further comprising a cover coupled with the catch tray above the mesh screen.

19. The system of claim 1, further comprising an oil-water separator upstream of the flow distributor.

20. The system of claim 8, wherein the contaminated fluid supply contains a contaminated fluid comprising liquid and contaminate.

21. The system of claim 20, wherein the contaminated fluid is a drilling mud, an air drilling misting fluid, produced water, frac fluid, washdown water from an oil refinery or petrochemical plant, wastewater from an oil refinery or petrochemical plant, dredged slurry, sewage slurry, paper pulp slurry, wine dreg slurry, wastewater from a factory, mixtures of water and bedding from an animal farm, slurry obtained by cleaning a sewer pipe, slurry obtained by cleaning a pipeline that is not a sewer pipe; or contaminated water from a body of water.

22. The system of claim 20, wherein the liquid of the contaminated fluid is water.

23. The system of claim 20, wherein the contaminate comprises flocculated solid or coagulated solid.

24. The system of claim 20, wherein the contaminate comprises metal, bacteria, or oil.

25. The system of claim 20, wherein the contaminate comprises arsenic, cadmium, mercury, lead, chromium, iron sulfide, iron oxide, or entrained hydrocarbons.

26. The system of claim 20, wherein the pitman arm is adapted to move the carriage within the catch tray in a reciprocating linear motion.

27. The system of claim 1, wherein the chemical additive injector comprises a chemical additive comprising a flocculant, a coagulant, prehydrated bentonite, an acid, a base, a biocide, a gel breaker, or a surfactant.

28. A system comprising:
a catch tray;
a flow distributor comprising an inlet and an outlet, wherein the flow distributor is coupled with the catch tray;
a mesh screen within the catch tray, the mesh screen comprising 80 mesh or smaller, wherein the value of mesh is determined by the number of openings per linear inch, wherein the mesh screen is static during a reclamation of contaminated fluids operation;
a chemical additive injector, the chemical additive injector in fluid communication with the inlet of the fluid distributor;
a carriage within the catch tray, wherein the carriage comprises one or more conduits with one or more nozzles; and
a pitman arm coupled with the carriage, wherein the pitman arm is coupled with a motor, wherein the pitman arm is adapted to move the carriage within the catch tray in a reciprocating motion during the reclamation of contaminated fluids operation.

29. The system of claim 1, wherein the one or more conduits is in fluid communication with a clarified liquid tank.

30. The system of claim 1, wherein the pitman arm is disposed within the catch tray.

31. The system of claim 14 further comprising a recirculation conduit, the recirculation conduit fluidly connecting the separator with a contaminated fluid supply.

32. The system of claim 1, wherein the catch tray, flow distributor, mesh screen, drive bar, and pitman arm are formed from stainless steel.

* * * * *